United States Patent [19]
Tomita

[11] Patent Number: 4,571,969
[45] Date of Patent: * Feb. 25, 1986

[54] AUTOFRETTAGE PROCESS

[75] Inventor: Nobuya Tomita, Fairfield, Ohio

[73] Assignee: National Distillers and Chemical Corporation, New York, N.Y.

[*] Notice: The portion of the term of this patent subsequent to Nov. 29, 2000 has been disclaimed.

[21] Appl. No.: 532,415

[22] Filed: Sep. 15, 1983

Related U.S. Application Data

[63] Continuation-in-part of Ser. No. 288,432, Jul. 30, 1981, Pat. No. 4,417,459.

[51] Int. Cl.$^4$ .............................................. B21D 26/02
[52] U.S. Cl. ........................................... 72/56; 72/61; 29/1.11; 29/446
[58] Field of Search ...................... 29/1.11, 446; 72/60, 72/56, 58, 61

[56]  References Cited
U.S. PATENT DOCUMENTS

| | | | |
|---|---|---|---|
| 1,329,762 | 2/1920 | Guy | 29/1.11 |
| 1,391,010 | 9/1921 | Schneider | 29/1.11 |
| 1,495,587 | 5/1924 | Grimm | 29/1.11 |
| 1,602,282 | 10/1926 | Methlin | 29/1.11 |

Primary Examiner—Daniel C. Crane
Assistant Examiner—David B. Jones
Attorney, Agent, or Firm—Kenneth D. Tremain

[57]  ABSTRACT

An autofrettage process which relates to the autofrettage of thick-walled cylinders through the cyclical application of high pressure to the internal bore of the cylinder. The invention encompasses the autofrettage of cylindrical members in cyclical pressure stages each of a few seconds to a few minutes in duration during each of which the bore of the cylinder being autofrettaged is subjected to a pressure in the range of about zero to the lower of the two pressures; one is the pressure that causes a complete plastic deformation to the outer wall and the other is twice the bore yield pressure. Preferably, the pressurizable hydraulic fluid medium utilized for the autofrettage is ethylene glycol or hydraulic oil, or any similar fluid which will not freeze or solidify at the pressures encountered during the inventive process. The autofrettage pressure may be increased between one or more cyclic applications of pressure.

33 Claims, 20 Drawing Figures $r_1$ = INNER RADIUS (1.140)
$r_2$ = CENTER RADIUS (2.755)
$r_a$ = PLASTICALLY YIELDED RADIUS MAXIMUM SHEAR RANGE VS. CYCLES TO FAILURE AUTOFRETTAGED (98 ksi) THICK-WALLED CYLINDER OF MATERIAL MT8-A STRESS DISTRIBUTION OF THICK-WALLED CYLINDER
(CLOSED-END) AT 18TH REVERSAL TO ZERO PRESSURE PRESSURE VS. TANGENTIAL STRAIN AT O.D. OF THICK-WALLED CYLINDER (OPEN-END) REPEATED AUTOFRETTAGE BETWEEN 100 ksi AND ZERO EFFECTIVE STRESS-EFFECTIVE STRAIN AT I.D. OF
THICK-WALLED CYLINDER (CLOSED-END)
REPEATED AUTOFRETTAGE BETWEEN 100 ksi AND ZERO EFFECTIVE STRESS-EFFECTIVE STRAIN AT I.D. OF
THICK-WALLED CYLINDER (OPEN-END)
REPEATED AUTOFRETTAGE BETWEEN 100 ksi AND ZERO STRESS DISTRIBUTION OF THICK-WALLED CYLINDER (CLOSED-END) AT FIRST REVERSAL TO 100 ksi PRESSURE STRAIN DISTRIBUTION OF THICK-WALLED CYLINDER (CLOSED-END) AT FIRST REVERSAL TO 100 ksi PRESSURE STRESS DISTRIBUTION OF THICK-WALLED CYLINDER
(CLOSED-END) AT SECOND REVERSAL TO ZERO PRESSURE STRAIN DISTRIBUTION OF THICK-WALLED CYLINDER
(CLOSED-END) AT SECOND REVERSAL TO ZERO PRESSURE STRESS DISTRIBUTION OF THICK-WALLED CYLINDER
(CLOSED-END) AT 17th REVERSAL TO 100 ksi PRESSURE STRAIN DISTRIBUTION OF THICK-WALLED CYLINDER (CLOSED-END) AT 17th REVERSAL TO 100 ksi PRESSURE STRESS DISTRIBUTION OF THICK-WALLED CYLINDER (CLOSED-END) AT 18th REVERSAL TO ZERO PRESSURE STRAIN DISTRIBUTION OF THICK-WALLED CYLINDER
(CLOSED-END) AT 18th REVERSAL TO ZERO PRESSURE

AUTOFRETTAGE PROCESS

CROSS-REFERENCE TO RELATED APPLICATIONS

This application is a continuation-in-part application of my prior application U.S. Ser. No. 288,432, filed on July 30, 1981, now U.S. Pat. No. 4,417,459, entitled "Autofrettage Process".

The term of this patent beyond Nov. 29, 2000 has been expressly disclaimed by a Terminal Disclaimer.

BACKGROUND OF THE INVENTION

The present invention relates to an autofrettage process and, more particularly, relates to the autofrettage of thick-walled cylinders through the cyclical application of high pressure to the internal bore of the cylinder.

In the design of thick-walled cylinders which are utilized as compressor cylinders, pump cylinders, high pressure tubing, process reactors and vessels, nuclear reactors, isostatic vessels, or gun barrels and the like, various fatigue and fracture characteristics must be taken into consideration when selecting the material and in choosing the various dimensions. Cylinders of this type which are generally subjected to sudden and frequently dramatic pressure fluctuations, such as the pressure generated in a gun barrel upon the firing of the weapon, pressure reversals in pump cylinders or in process reactors employing high-pressure piping, are prone to premature failure as the result of material fatigue or embrittlement produced by the internal pressures to which the bores of the cylinders are exposed. Usually, the material employed for such cylinders is steel; normally an alloy steel having superior strength and fatigue properties.

In order to alleviate the problems encountered in subjecting thick-walled cylinders to alternating or fluctuating, internally acting high pressures, there has been developed a process for enhancing the strength of thick-walled cylinders which are subjected to repeated internal pressures. This process is commonly referred to as "autofrettage" and involves the application of such interior pressure to the bore of the cylinder so as to plastically deform at least the inner layers of the cylinder material beyond the elastic limit or yield strength of the material and to thereby generate "negative" or residual tangential compressive stresses at the cylinder bore. These residual stresses will counteract the destructive effects of the internal cyclical or intermittent high operating pressures to which the cylinder is subjected so as to appreciably extend the service life of the cylinder. This plastic deformation of the inner bore of the cylinder beyond the elastic limit of the material so as to increase the service life is a function of the strength of the material, in essence, the type of steel or alloy utilized, and of the ratio of the outer diameter to the inner diameter of the cylinder. In effect, the basic advantage obtained through the autofrettaging of thick-walled cylinders which are subjected to cyclical, intermittent or fluctuating internal high operating pressures lies in that the maximum stresses of the cylinders in response to these operating pressures are decreased to a considerable extent to thereby impart a longer service life to the cylinders.

Discussion of the Prior Art

Process for the autofrettage of thick-walled cylinders have been known for a lengthy period of time and, basically, fall into one of two major categories, as follows:

(a) The insertion of an oversized mandril or ram into the bore of the cylinder so as to exert radial pressures through forced expansion or stretching of the bore and, resultingly, of the cylinder. This rather crude mechanical process, however, frequently fails to provide the desired results in the necessary formation of residual tangential compressive stresses at the bore of the cylinder and, at times, actually leads to the destruction of the cylinder.

(b) The generation of a high pressure within the cylinder beyond the elastic limit of the material so as to cause the plastic deformation of the layers of material extending radially outwardly of the bore either partially or entirely through the wall thickness of the cylinder. This extremely high pressure is generally disadvantageous in that it does not always produce the required residual tangential compressive stresses in the bores of the cylinders and, additionally, deforms the cylinder bore to an extent wherein the cylinder is no longer employable in its intended use, for example, in connection with its utilization as a gun barrel or piston cylinder in which the size of the cylinder bore must be maintained within narrowly prescribed bounds. Moreover, the extremely high autofrettaging pressure requires the use of large, complex and expensive pressure-generating and applicating equipment.

U.S. Pat. No. 1,391,009 discloses a process and apparatus for the manufacture of gun barrels by a "self hooping" process. While Schnider, the patentee, does not discuss autofrettage, it is presumed that "self hooping" refers to autofrettage. Schnider teaches the repetitive application of pressure to different discrete portions of the gun barrel to adapt his process to the contour of the barrel. There is no teaching in this patent that the cyclic repetition of the same or greater pressure with each cycle would result in a significant increase in the residual tangential compressive stresses in the barrel.

Thus, A. E. Guy U.S. Pat. No. 1,329,762 discloses an installation for applying expanding pressure to a material or filler within the bore of a thick-walled cylinder in order to effect an autofrettage process in a single-step operation. This patent disclosure is not capable of carrying out a precise cyclical application of autofrettage pressure analgous to the present invention in which lower pressures will afford the desired cylinder stressing in a simplified and inexpensive manner.

Although F. C. Langenberg U.S. Pat. Nos. 1,553,824 and 1,553,825; illustrate and disclose multiple-step pressure applications, with the possible interposition of an annealing for softening the cylinder material, there is no mention of the only partial plastic deformation of the inner material layers of the cylinder as in the present instance, but rather the total controlled expansion of the cylinder. In addition thereto, the pressure medium employed in the Langenberg U.S. Patents is water, which is not suitable at the cyclical pressures employed for the autofrettaging process of the instant invention.

SUMMARY OF THE INVENTION

Accordingly, it is a primary object of the present invention to provide for an autofrettage process for thick-walled cylinders which will impart residual tangential compressive stresses to the bore of the cylinder.

A more specific object of the present invention is to provide for the autofrettage of cylindrical members in cyclical pressure stages so as to limit the plastic deformation of the cylinder bore while affording the residual tangential compressive stresses.

Still another object of the present invention lies in the provision of an autofrettage process in which the cyclical pressure is imparted to the cylindrical member for short periods of time and within predetermined pressure ranges lower than the single step pressure utilized in the prior art.

In order to attain the foregoing and other objects the invention contemplates the autofrettage of cylindrical members in cyclical pressure stages each of a few seconds to a few minutes in duration during each of which the bore of the cylinder being autofrettaged is subjected to a pressure in the range of about zero to where about 25% of the wall thickness commencing radially outwardly from the bore is plastically deformed. Preferably, the pressurizable hydraulic fluid medium utilized for the autofrettage is ethylene glycol or hydraulic oil, or any similar fluid which will not freeze or solidify at the pressures encountered during the inventive process.

BRIEF DESCRIPTION OF THE DRAWINGS

Reference may now be had to the following detailed description of an exemplary autofrettage process and apparatus pursuant to the invention, taken in conjunction with the accompanying drawings; in which.

DETAILED DESCRIPTION

Figure 1:
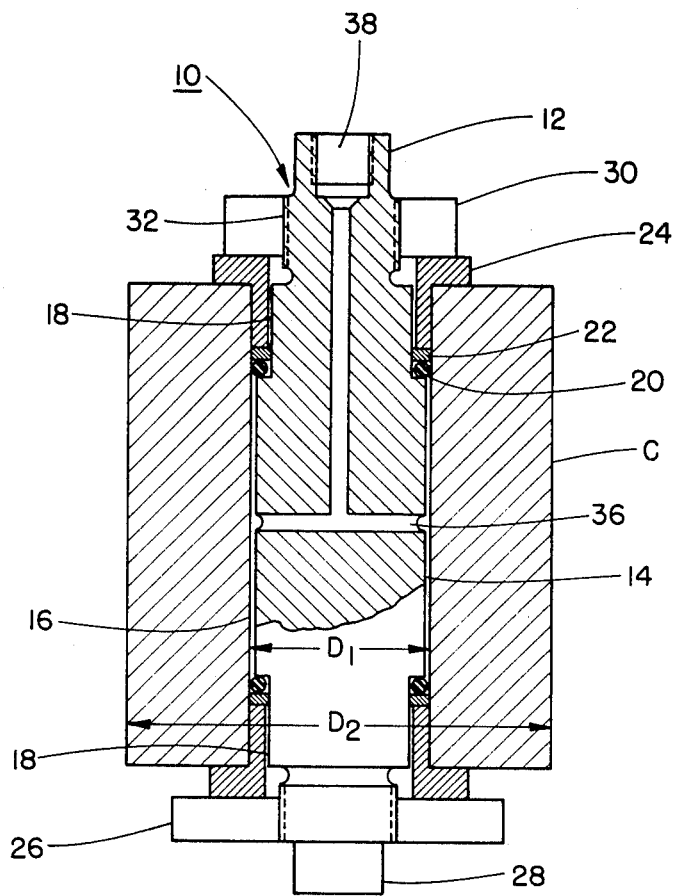
FIG. 1 illustrates a longitudinal sectional view through an autofrettage apparatus for effecting the autofrettage pursuant to the invention.

Referring now in detail to FIG. 1 of the drawings, a schematically illustrated autofrettage apparatus 10 includes a mandril 12 onto which there is clamped a length of thick-walled cylinder C which is to be subjected to autofrettage.

The diameter 14 of the mandril 12 is smaller than the bore diameter $D_1$ of the cylinder C so as to provide for an annular space 16. The end portions 18 of mandril 12 have stepped down diameters to facilitate insertion of seals 20, backup rings 22 and sleeves 24 at each end of the cylinder C. An end plate 26 into which there is threaded the end 28 of mandril 12, and a nut 30 threaded onto mandril end 32 provide for the sealing of the interior of cylinder C.

A central longitudinal bore 34 in mandril 12 connects at one end thereof with a radial bore 36 communicating with the annular space 16. The end of bore 34 at the end 32 of the mandril connects to a source of pressure (not shown) through a threaded connection 38. The source of pressure may be a supply of a pressurizable fluid medium, such as ethylene glycol or hydraulic oil. The fluid medium is adapted to be pressurized up to slightly below the bore yield pressure for periods of 1 second up to a few minutes, then reduced to zero and the process repeated. The pressure reduction may be held to one half of the bore yield pressure rather than zero so as to provide for an optimum pressure reversal for each pressurization stage of the autofrettage process.

FIG. 1 is not the only method to seal a high pressure fluid. Many other types of seals without a use of a mandril are also applicable.

Figure 2:
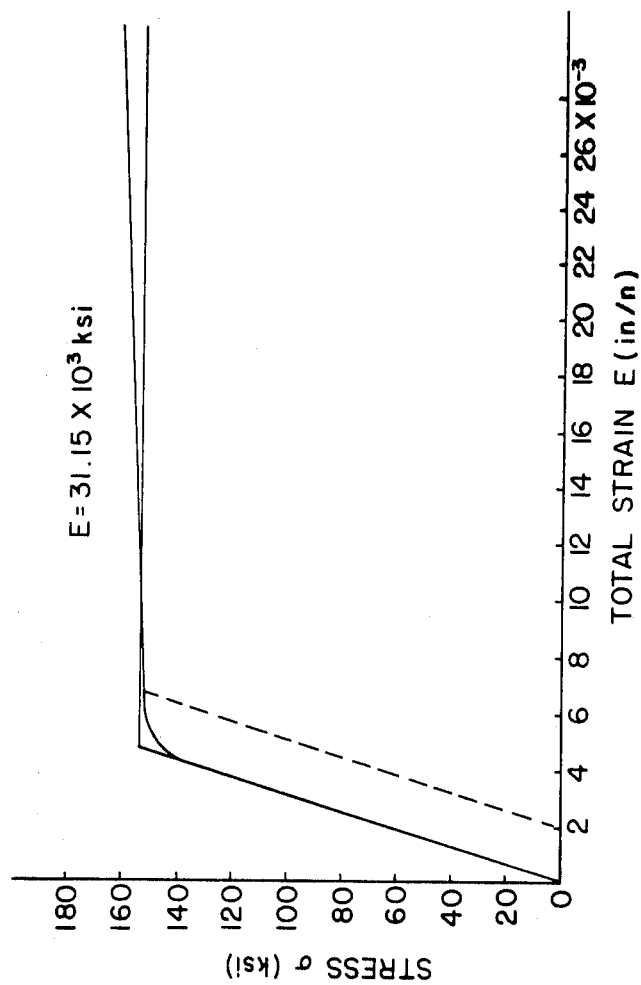
FIG. 2 shows the stress-strain curve for a cylinder material consisting of AISI 4333 M6 steel alloy.

FIG. 2 illustrates the stress-strain curve of an AISI 4333 M6 steel, an alloy frequently employed for thick-walled cylinders.

Figure 3:
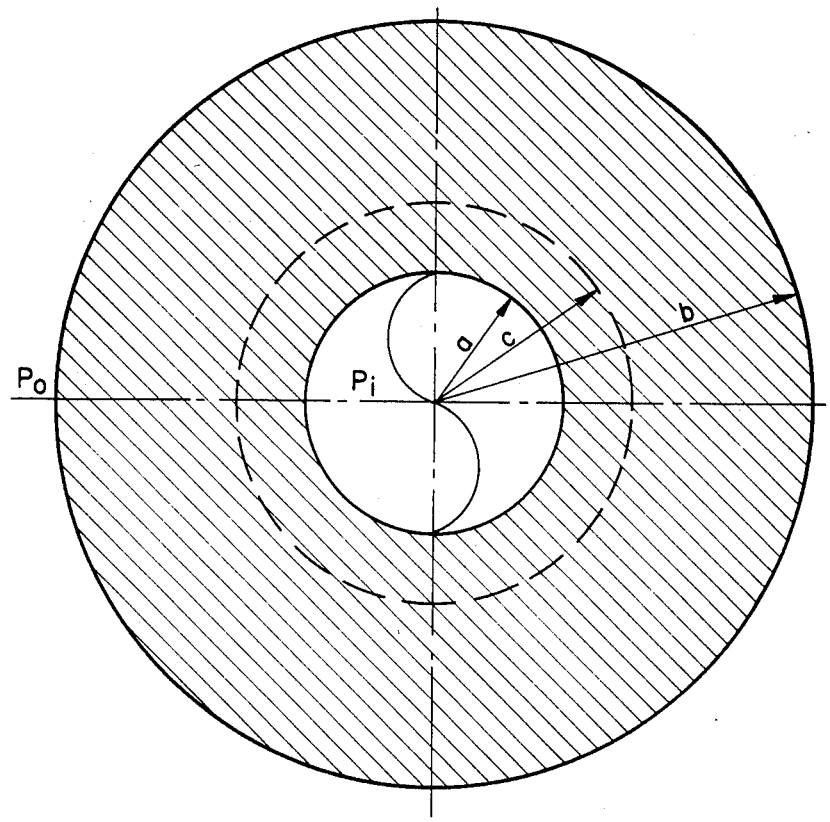
FIG. 3 shows a cross-sectional view through the thick-walled cylinder.
Figure 4:
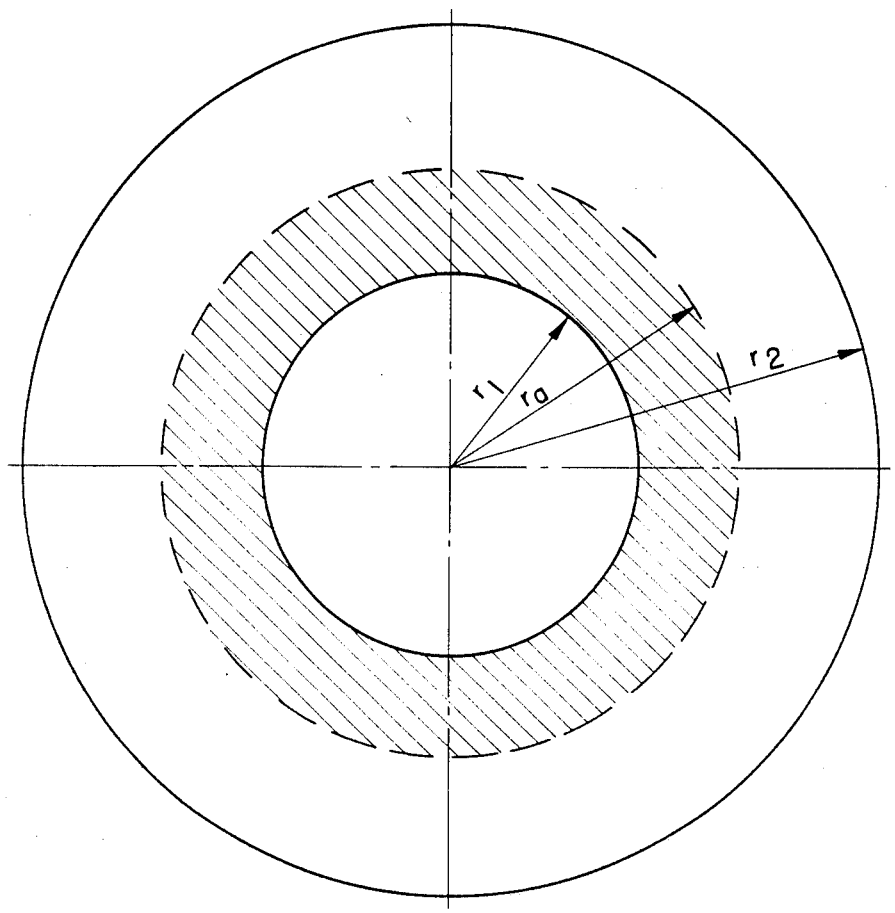
FIG. 4 shows a partially yielded thick-walled cylinder.

FIG. 3 shows a cross section of a thick-walled cylinder, and FIG. 4 illustrates a partially yielded thick-walled cylinder.

FIG. 5 through FIG. 20 are the results of analyses and tests of the thick-walled cylinder whose chemical, mechanical and dimensional properties are listed in Table 1.

Figure 5:
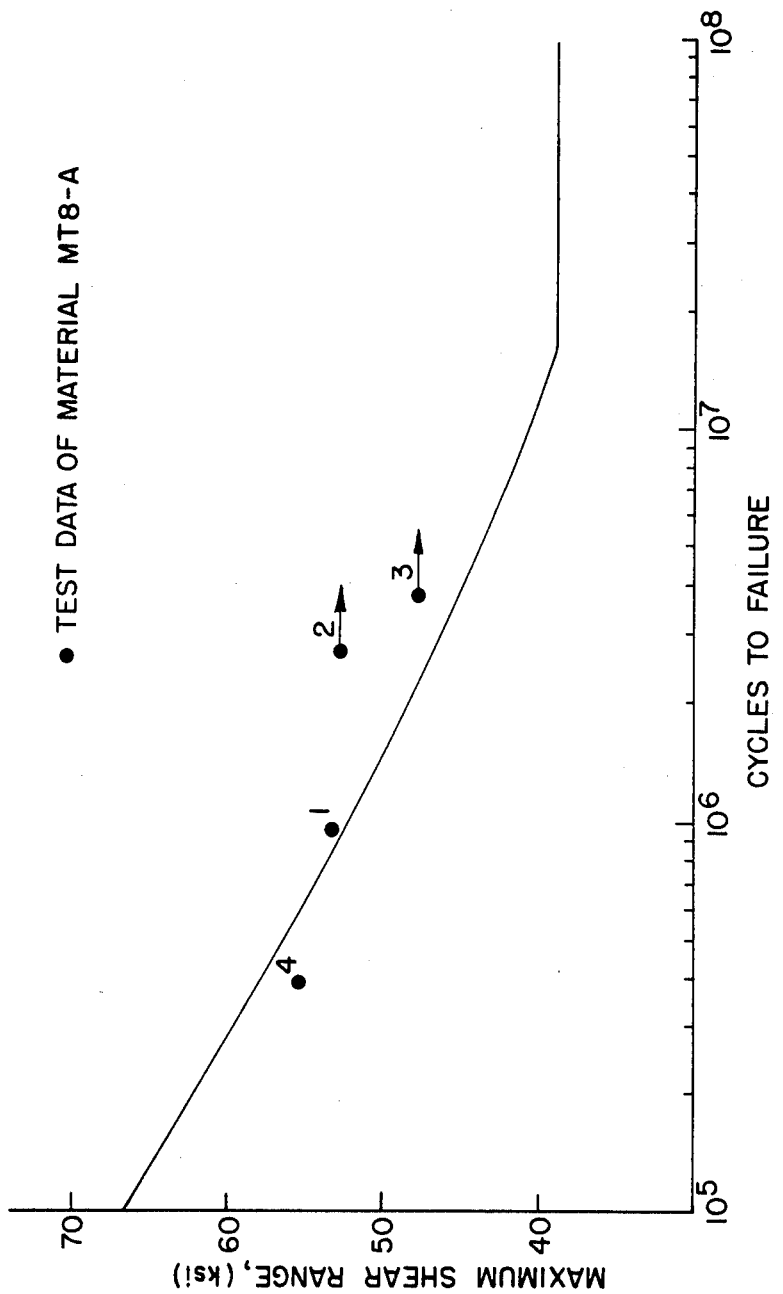
FIG. 5 shows a graph plotting shear range versus cycles to failure of autofrettaged cylinder.
Figure 6:
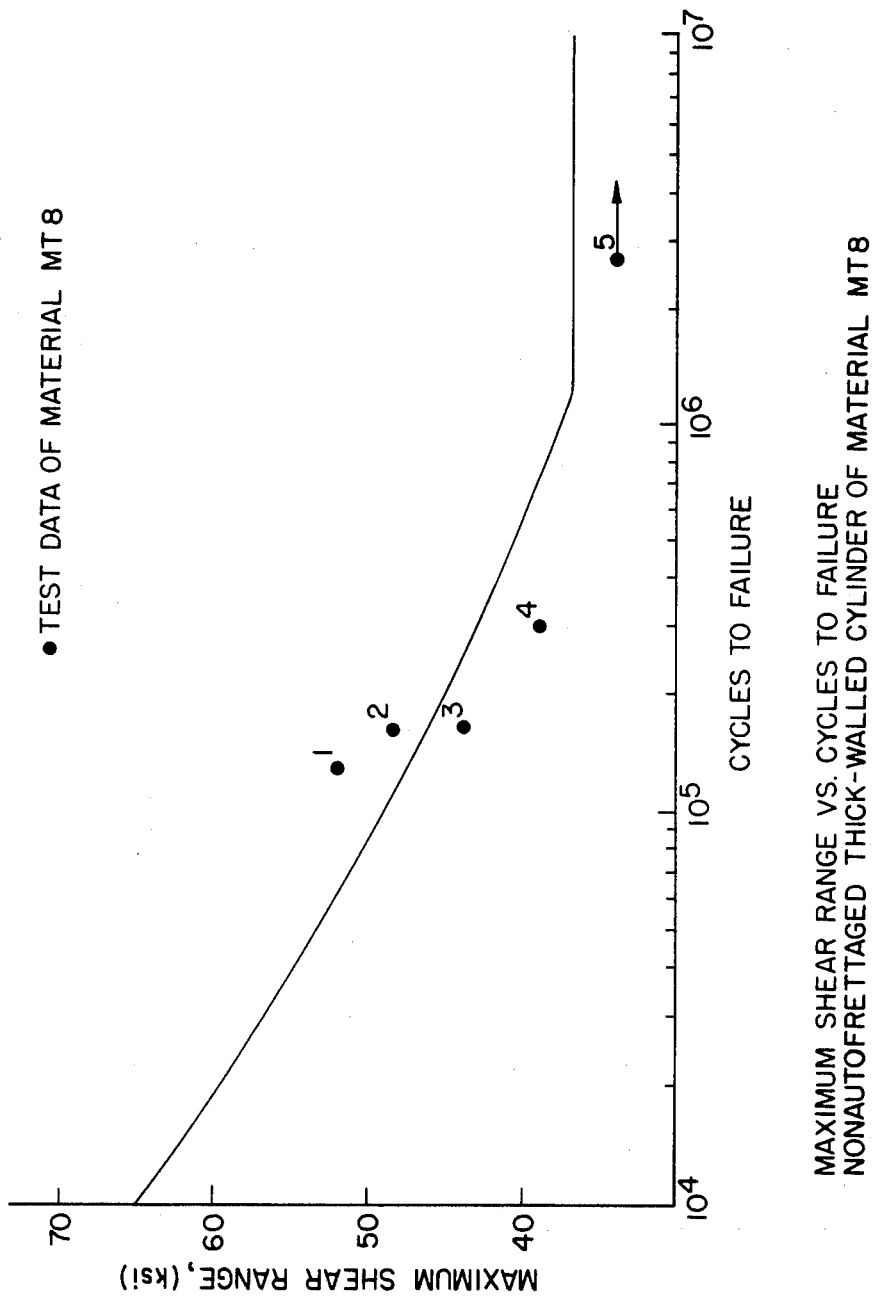
FIG. 6 is similar to FIG. 5 but illustrative of non-autofrettage cylinder.

Comparison of FIG. 5 to FIG. 6 clearly demonstrates that the fatigue strength of the autofrettaged thick-walled cylinder is higher than that of the non-autofrettaged.

Figure 7:
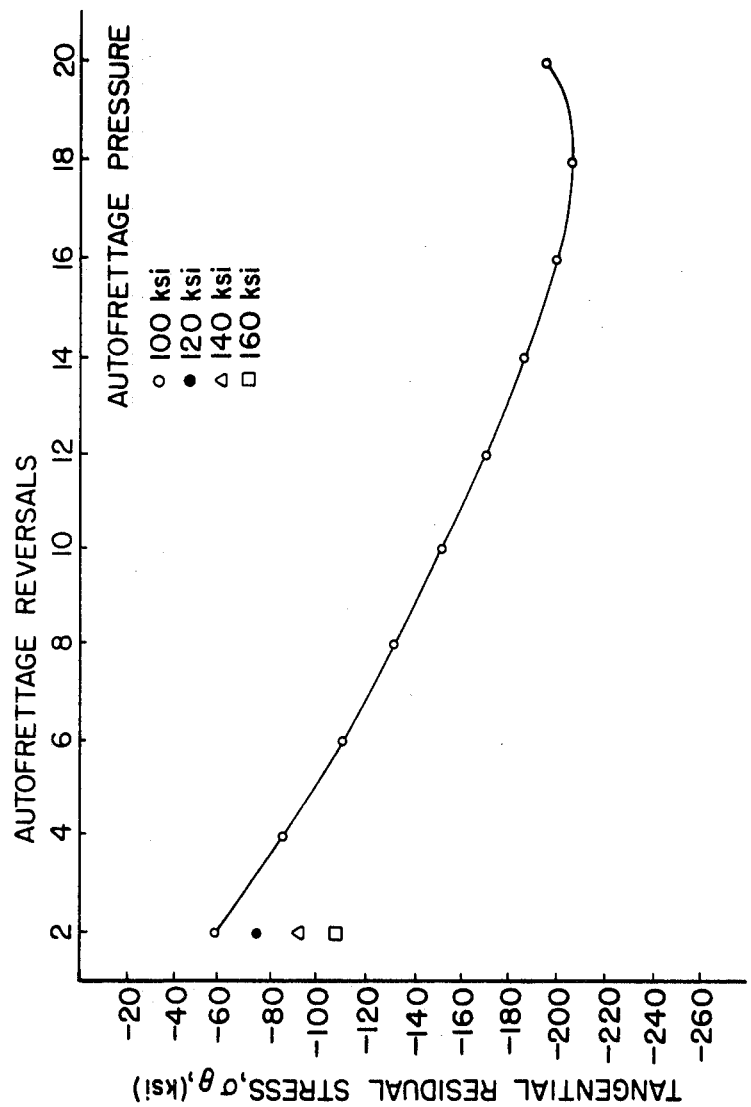
FIG. 7 illustrates a plot of residual stresses-strains of closed-end cylinder of repeated autofrettages versus single-cycle autofrettage.
Figure 8:
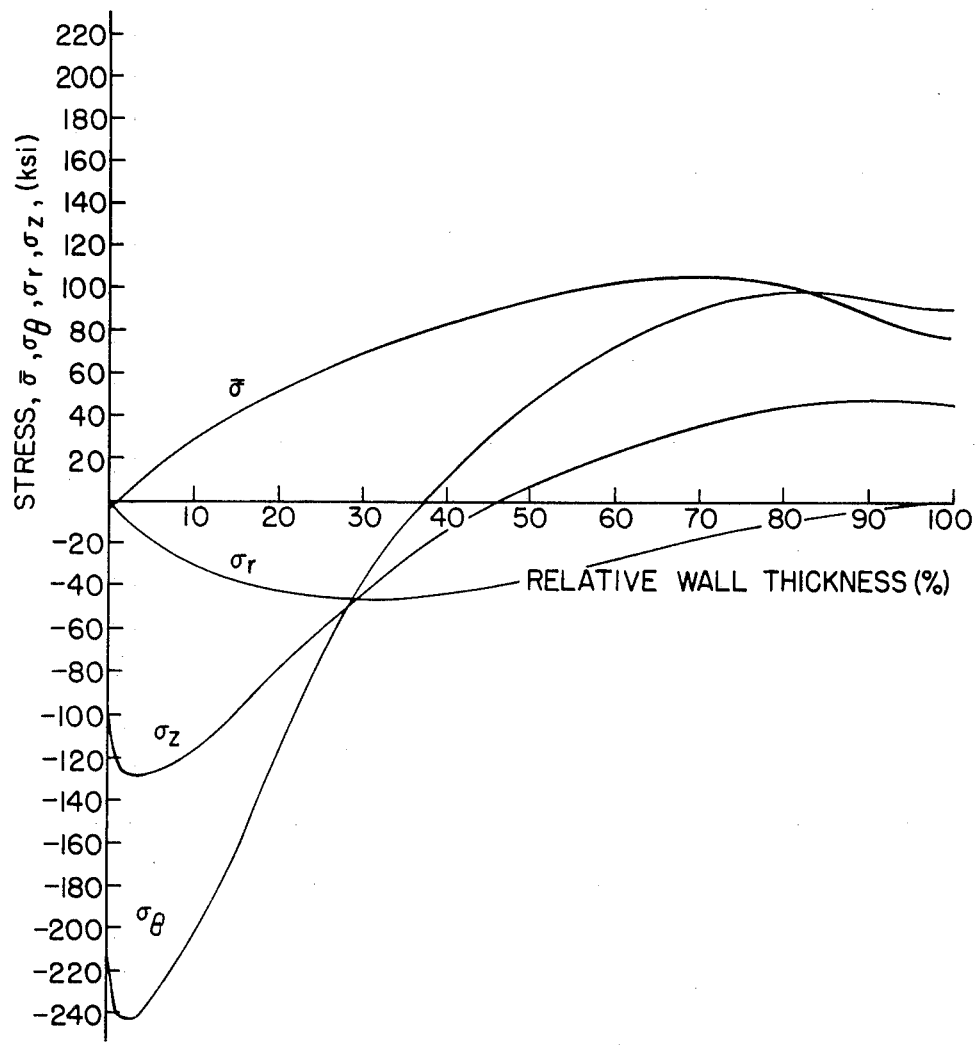
FIG. 8 illustrates stress distribution of closed-end cylinders at 18th reversal (9 cycles) to zero pressure.

The improvement of the residual tangential stresses of the cyclically autofrettaged cylinder as compared with the single-cycle autofrettaged cylinder is set forth in FIG. 7 of the drawings, while the stress distribution at the ninth autofrettage cycle is set forth in FIG. 8.

An experiment of cyclical autofrettage was effected on a cylinder as set forth hereinbelow:

Computations were made using the material properties and the thick-walled cylinder dimensions listed in Table 1. The cross section of the thick-walled cylinder is shown in FIG. 4.

TABLE I

Material, Mechanical, Fatigue and Fracture Properties of AISI 4333 M6 (all units in psi, unless noted)

| Chemical composition, weight percent | | | | | | | | | |
|---|---|---|---|---|---|---|---|---|---|
| C | Mn | P | S | Si | Ni | Cr | Mo | Al | Cu |
| 0.37 | 0.92 | 0.023 | 0.005 | 0.29 | 2.35 | 1.04 | 0.56 | 0.09 | 0.18 |

Heat treatment
Air melted, vacuum degassed and hot rolled
Quenched and tempered at 1080° F

| Monotonic properties | |
|---|---|
| Elastic modulus | |
| Tangential | $29.6 \times 10^6$ |
| Axial | $29.8 \times 10^6$ |
| Compression | $30.5 \times 10^6$ |
| Yield strength, 0.2% offset | |
| Tangential | 152,000 |
| Axial | 149,200 |
| Compression | 154,400 |
| Yield strength, 0.05% offset | 148,500 |
| Tangential | |
| Ultimate strength | |
| Tangential | 164,000 |
| Axial | 164,050 |
| Reduction of area, percent | |
| Tangential | 46.97 |
| Axial | 58.95 |
| Elongation, percent | |
| Tangential | 27.10 |
| Axial | 23.20 |
| Poisson's ratio | 0.30 |
| Charpy "V" notch | 60 ft-lbs |
| Axial | |

TABLE I-continued
Material, Mechanical, Fatigue and Fracture Properties
of AISI 4333 M6 (all units in psi, unless noted)

| | |
|---|---|
| Hardness | 34~37 |
| Rockwell C scale | |
| Transition temperature | −100° F |
| Cyclic properties | |
| Elastic modulus | 30.14 × 10⁶ |
| Tangential | |
| Yield strength, 0.2% offset | |
| Cyclic | 104,500 |
| Incremental, block 2 | 101,300 |
| Incremental, block 6 | 85,600 |
| Fatigue strength coefficient $\sigma'_f$ | 264,490 |
| Fatigue strength exponent b | −0.0973 |
| Fatigue ductility coefficient $\epsilon'_f$ | 0.826 |
| Fatigue ductility exponent c | −0.776 |
| Transition fatigue life $2N_t$ | 809 reversals |
| Fracture properties | |
| Fracture toughness $K_{IC}$ | 89.96 ksi in |
| Threshold stress intensity (R=0) $\Delta K_{th}$ | 6.90 ksi |
| Crack growth coefficient C | |
| Paris' coefficient (R=0) | 1.326 × 10⁻¹¹ |
| Forman's coefficient | 5.206 × 10⁻⁹ |
| Crack growth exponent m | |
| Paris' exponent | 3.753 |
| Forman's exponent | 3.215 |
| Thick-walled cylinder dimensions | |
| Nominal inside diameter | 55 mm |
| Actual inside diameter (average) | 57.91 mm |
| Nominal outside diameter | 140 mm |
| Actual outside diameter (average) | 139.95 mm |
| Bore finish | 5–10 R.M.S |
| Autofrettage pressure $P_a$ | 98,000 |
| Plastic-elastic boundary radius $r_a$ | 1.3602 |

In actual computations, the thick-walled cylinder is divided into 40 rings of equal thickness, stresses and strains are computed for each pressure reversal for both closed-end and open-end conditions. The pressure was repeated between zero and 100 ksi.

It has been commonly accepted that once a thick-walled cylinder is autofrettaged to a certain pressure, say $P_a$ ksi, it will shake down when the internal pressure $p_a$ is applied again. In other words, for the same pressure as applied previously, there will be no further plastic deformation in any element of the thick-walled cylinder.

This particular thick-walled cylinder, which is being studied, is made of AISI 4333 M6 material. It has 148.5 ksi yield strength at 0.05% offset strain (152.0 ksi at 0.2% offset strain), and the inside and outside radii of 1.140 and 2.755 inches or 57.9 mm and 140.0 mm respectively.

The theoretical bore yield pressure (Lame's solution) is 71.06 ksi for the closed-end thick-walled cylinder and 70.71 ksi for the open-end thick-walled cylinder.

When repeated internal pressure of 100 ksi was applied to this thick-walled cylinder, it was found that the plastically deformed zone, which is an annulus, reached the outer radius at 10 cycles for the closed-end thick-walled cylinder and at 11 cycles for open-end thick-walled cylinder.

The experimental indication of this fact has been in existence for many years when tangential strains at the outside diameter of thick-walled cylinders were recorded as autofrettaging pressure was repeated. The tangential strain showed some increase, however small it might be, at each repeated autofrettage pressure.

Figure 9:
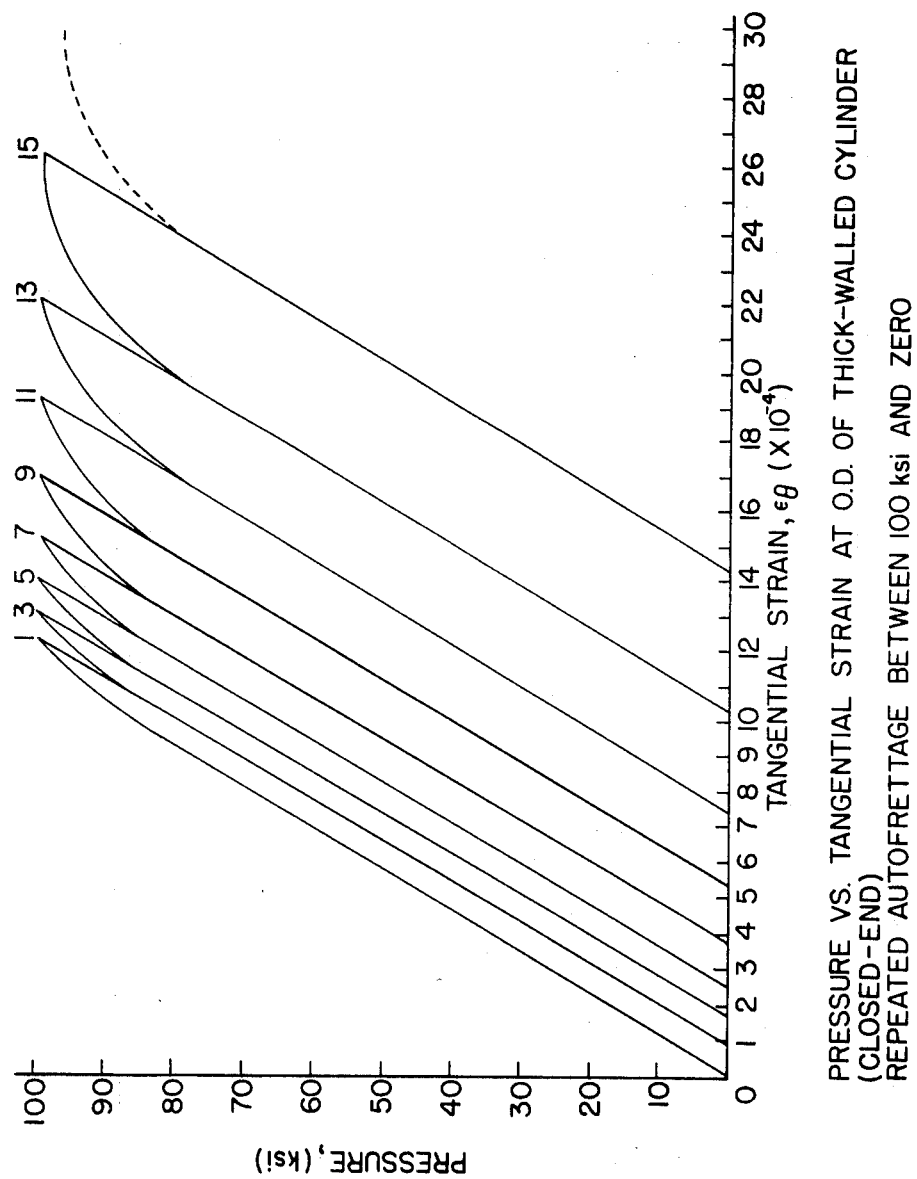
FIGS. 9 through 20 illustrates various stress-strain curves dependent upon cyclical autofrettage.
Figure 10:
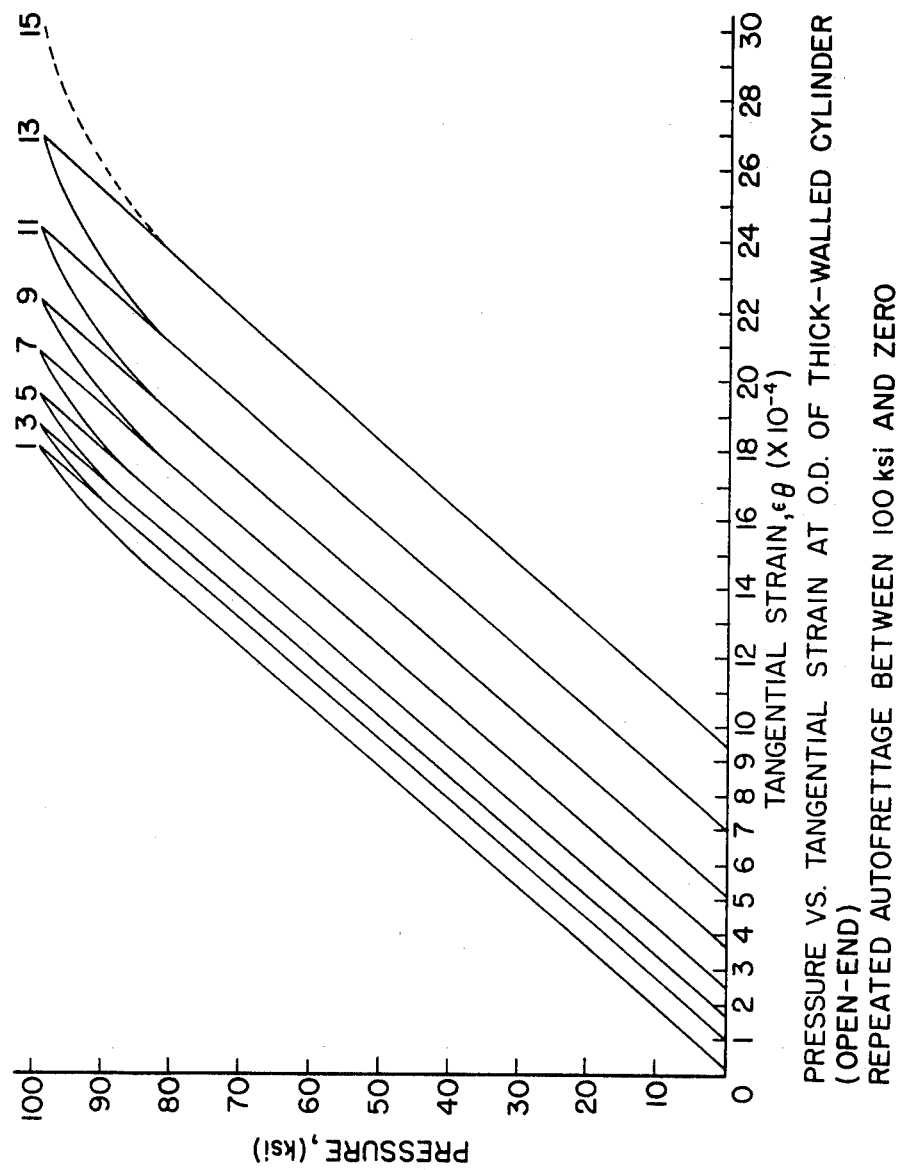

The computed tangential strains at the outside diameter of the thick-walled cylinder were plotted in FIG. 9 for the closed-end cylinder for sixteen pressure reversals (eight cycles) and in FIG. 10 for the open-end cylinder for fourteen pressure reversals (seven cycles) respectively.

Figure 11:
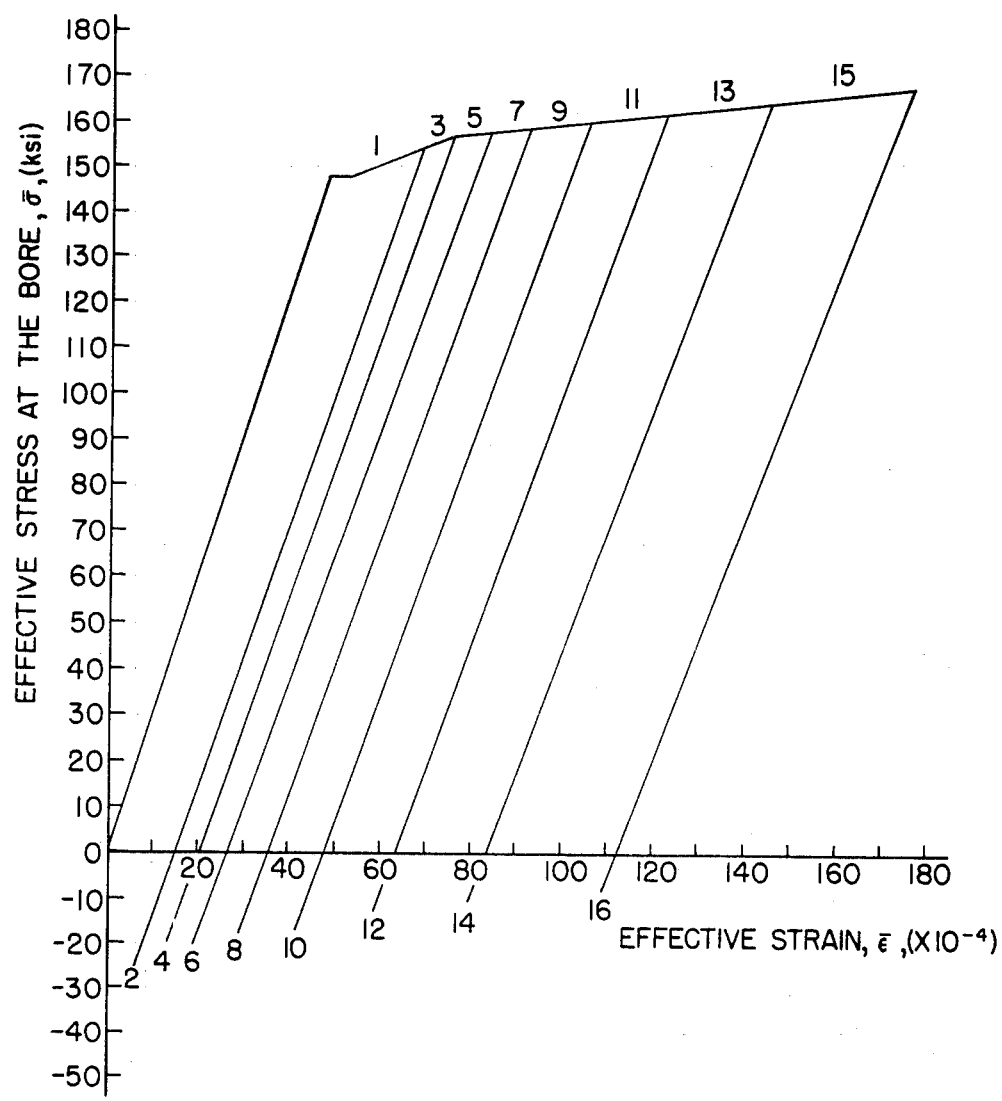
Figure 12:
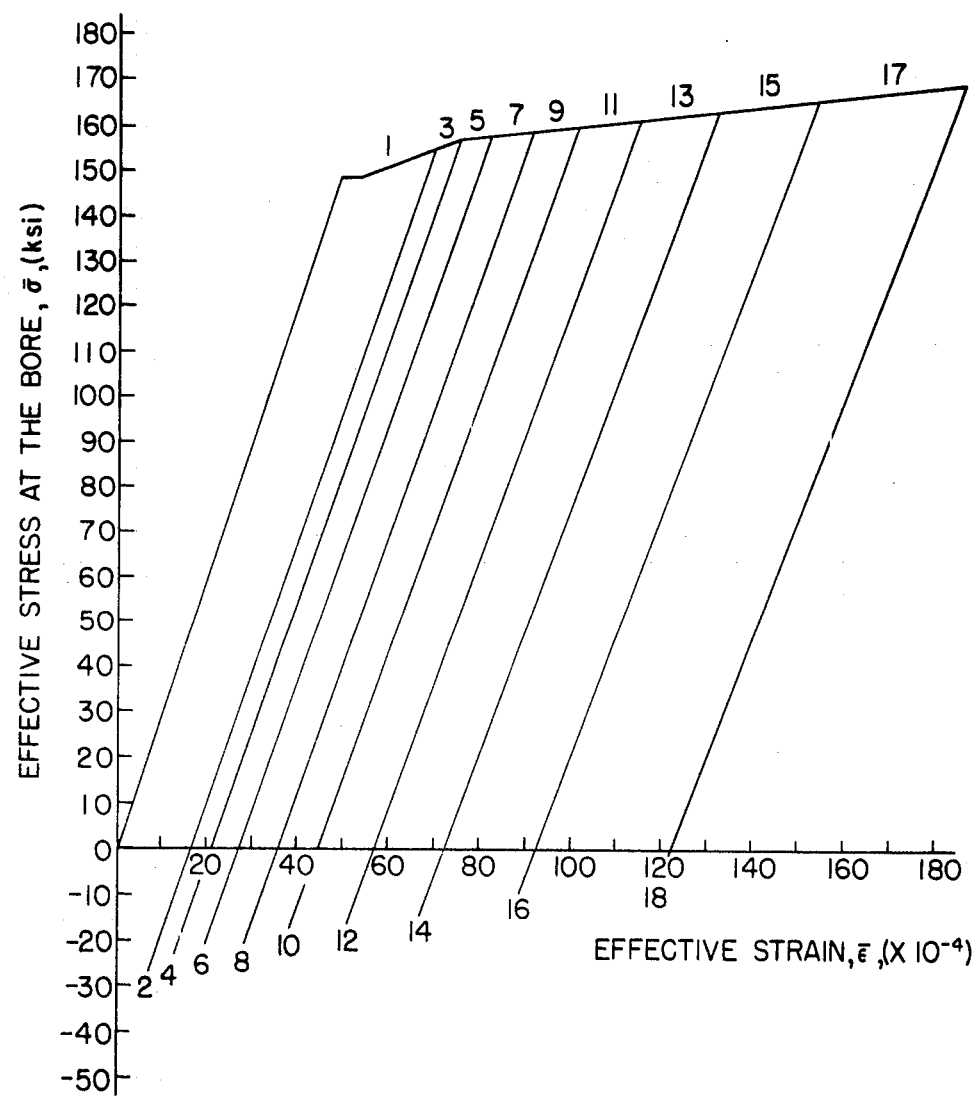

The computed effective strains (corrected) at the bore of the thick-walled cylinder were plotted in FIG. 11 for the closed-end cylinder for sixteen reversals (eight cycles) and in FIG. 12 for the open-end cylinder for eighteen reversals (nine cycles) respectively.

Figure 13:
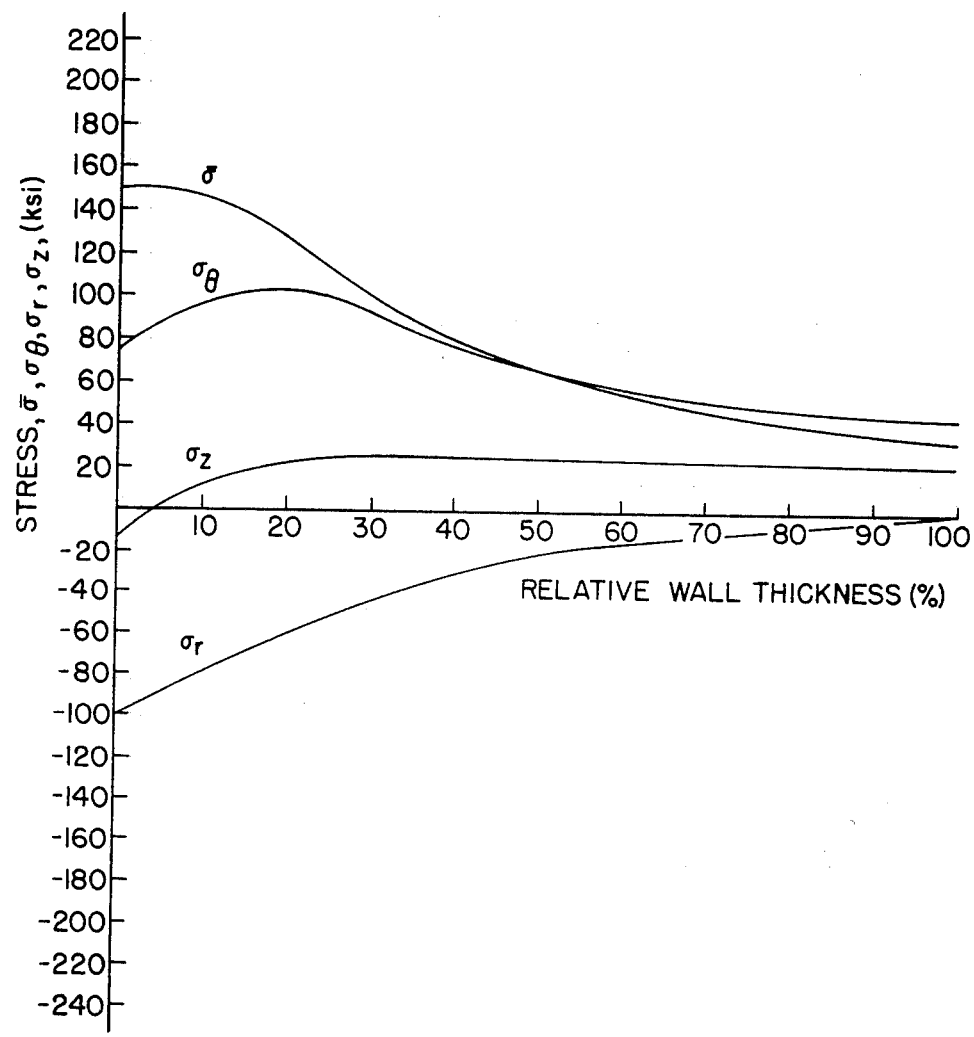
Figure 14:
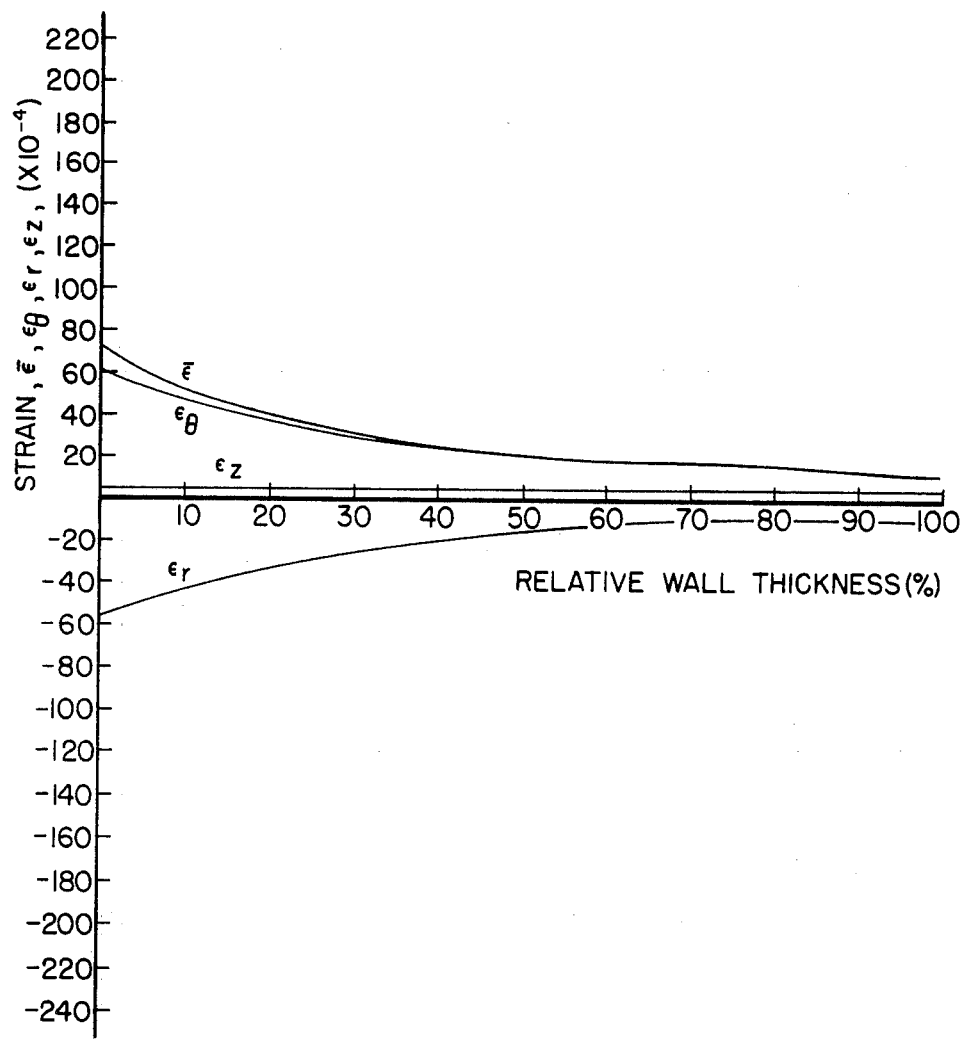

FIGS. 13 and 14 show stresses and strains across the wall thickness of the closed-end thick-walled cylinder for the first pressure reversal.

Figure 15:
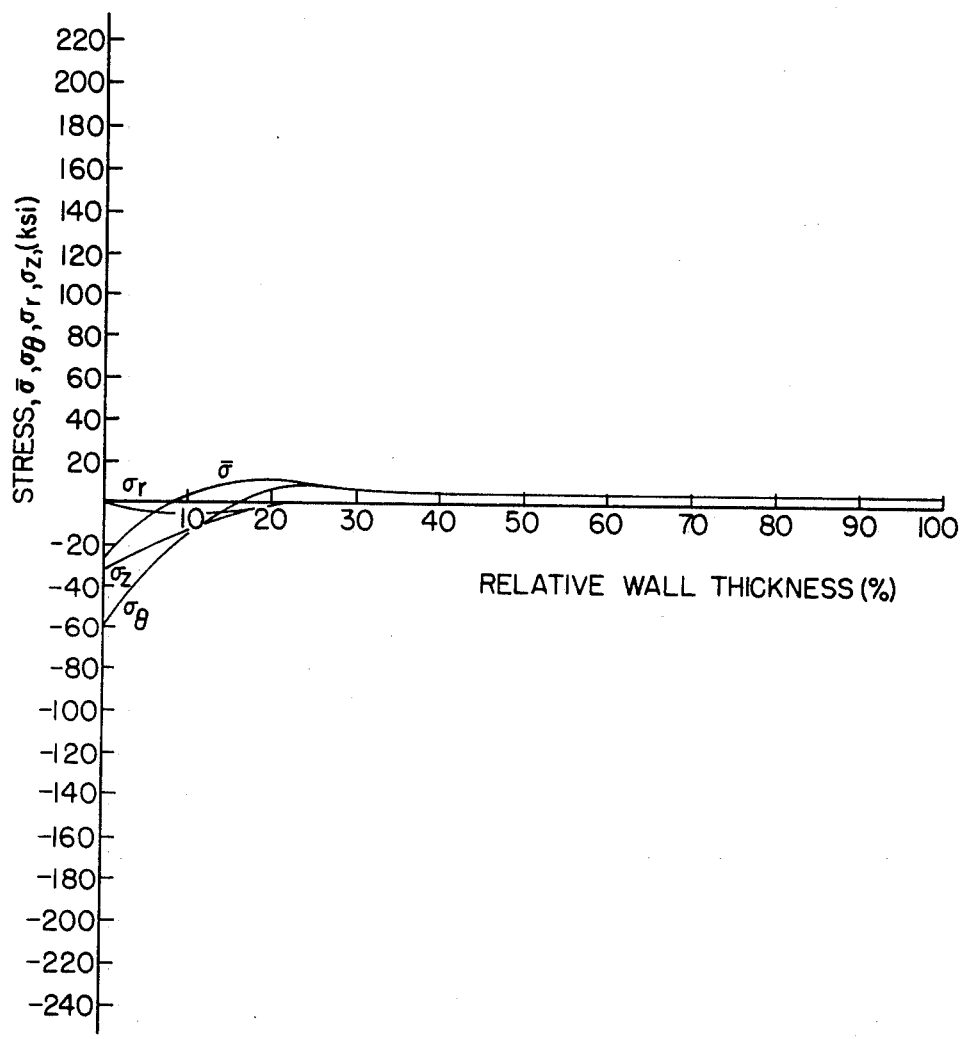
Figure 16:
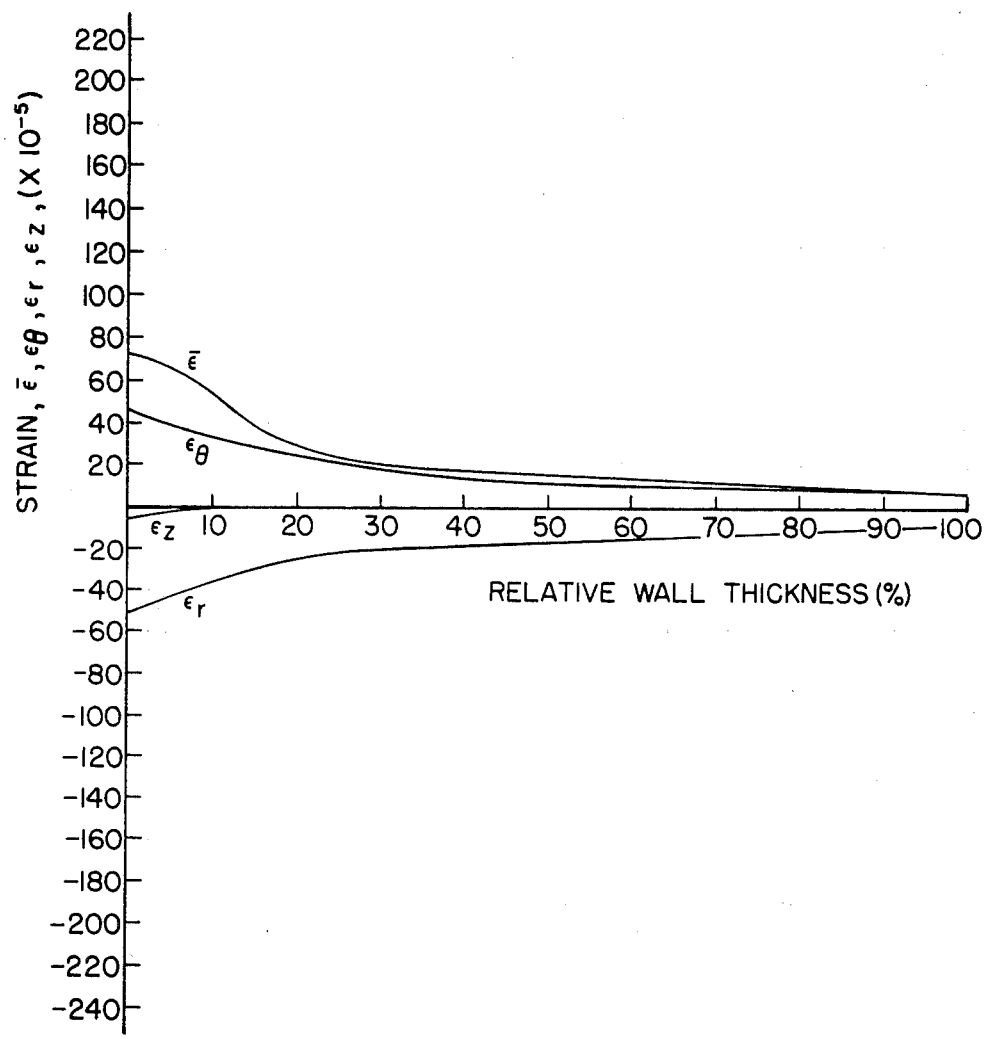
Figure 17:
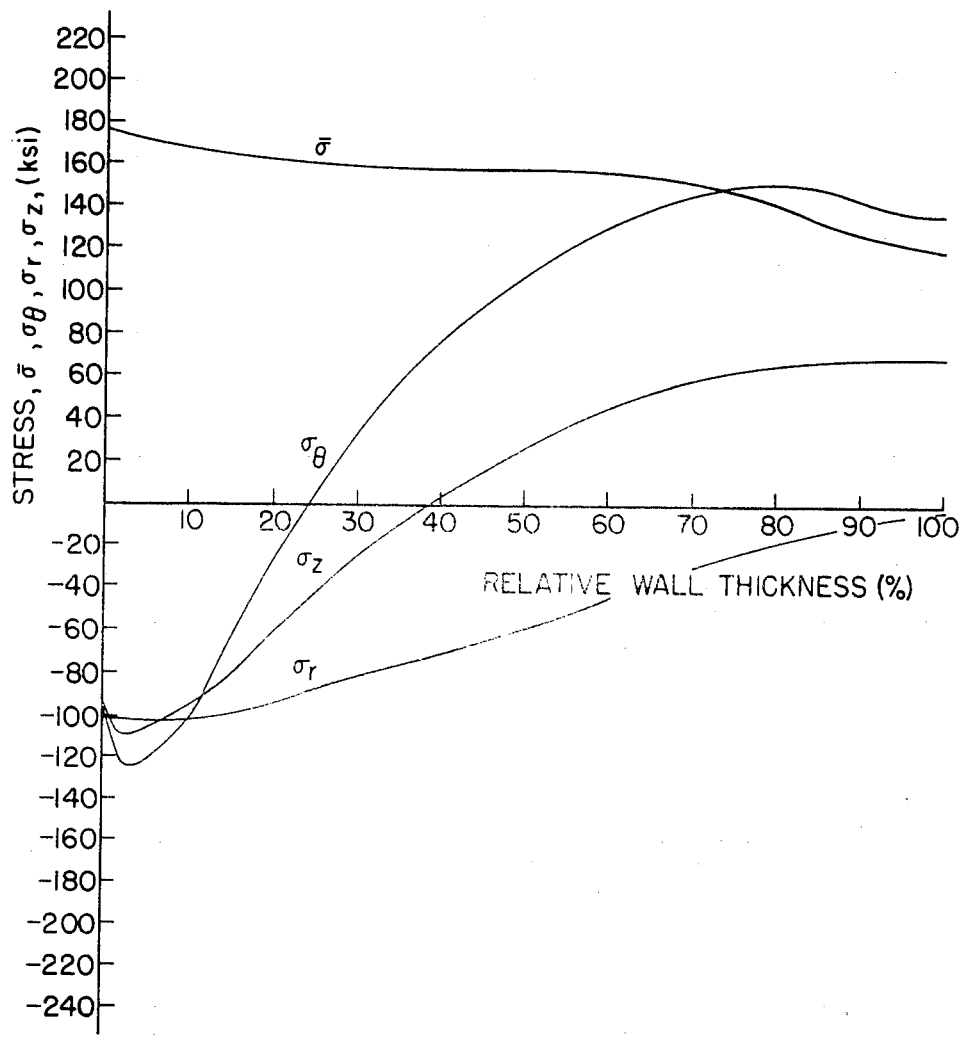
Figure 18:
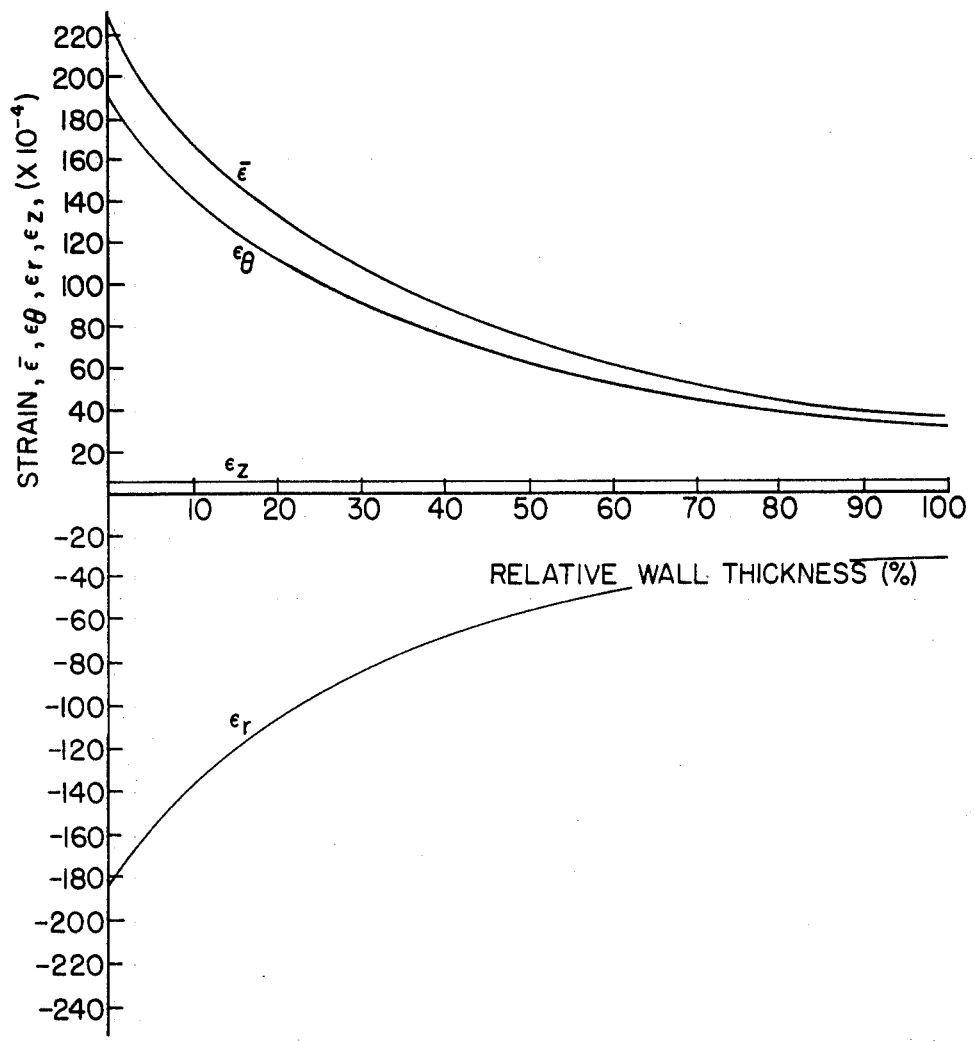
Figure 19:
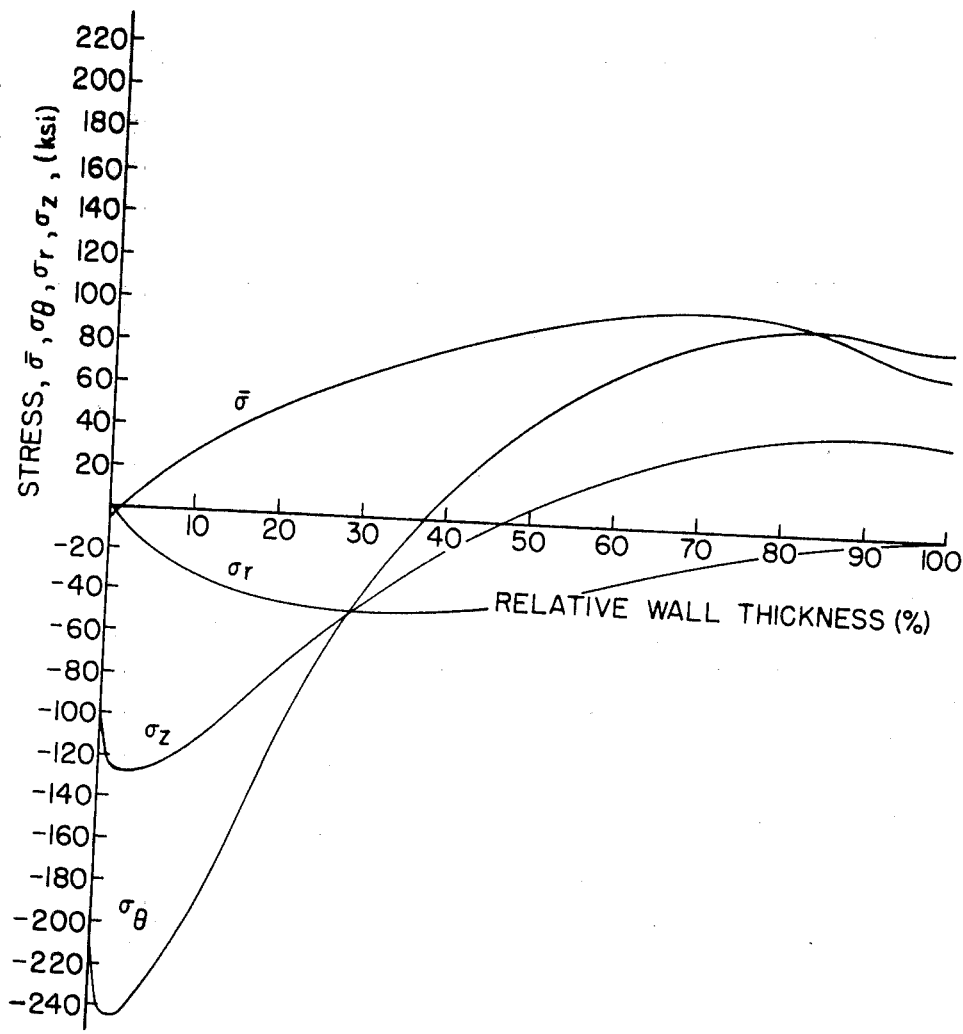
Figure 20:
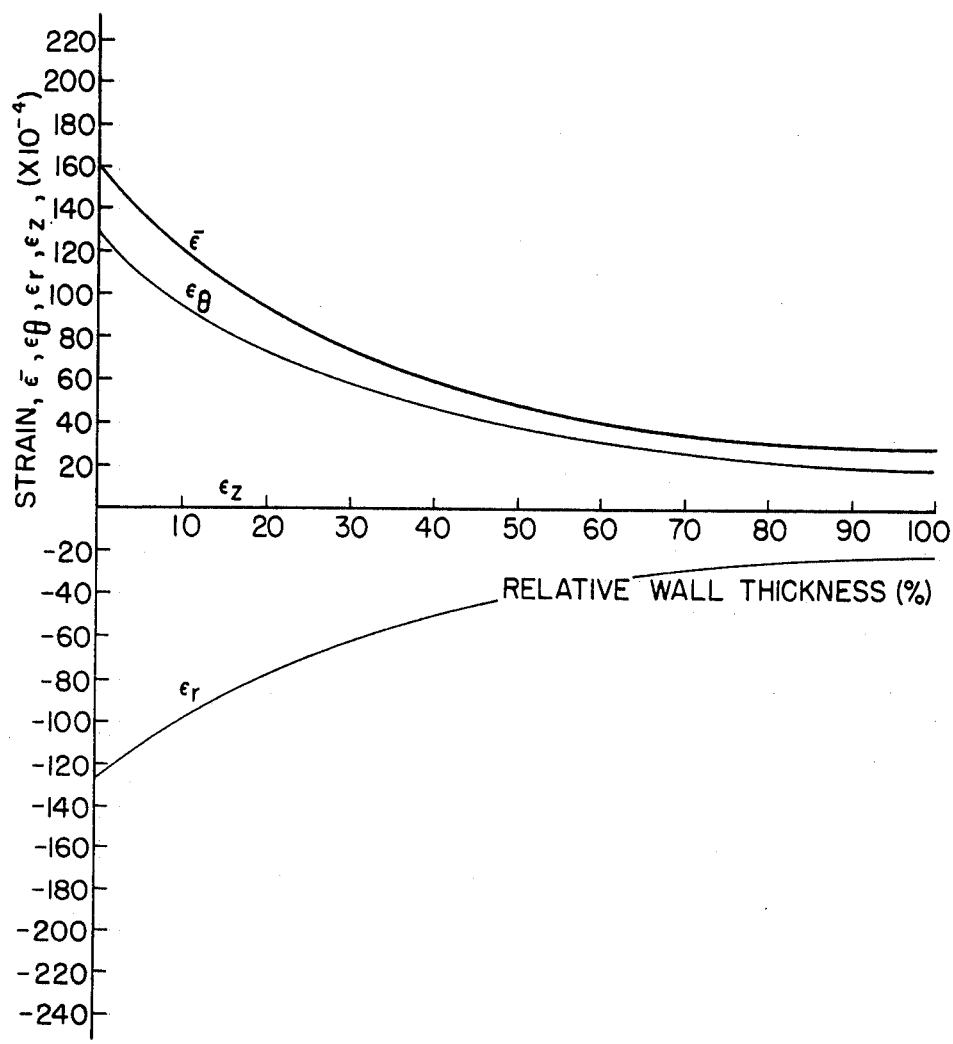

FIGS. 15 and 16 are the residual stresses and strains at second reversal or when the closed-end thick-walled cylinder is completely unloaded for the first time.

FIGS. 17, 18 and FIGS. 19, 20 are stresses and strains during the 17th and 18th reversals respectively. At 19th reversal, the closed-end thick-walled cylinder showed complete yielding to the outer radius.

The drawbacks and dangers in overstraining thick-walled cylinders are that large diameter dilations result and create tolerance problems. There are practical problems in producing high autofrettage pressure (100 ksi–200 ksi is common in industry), which might be considered as an optimum autofrettage pressure. Those problems may relate to pump capacity both in pressure and in volume, to compressability, viscosity and freezing of pressure media or fluid under high pressure, and to the failure of mechanical seals. Fluid can no longer be considered incompressible under high pressure (20%–30% compressability is not uncommon) and its viscosity rapidly increases exponentially with pressure creating various mechanical problems such as seal failures, plunger failures, check valve failures, line ruptures and so on.

One of the important findings of this research is the new process in autofrettage, which does not require higher autofrettage pressure to introduce high residual compressive stresses at the bore if the thick-walled cylinder is made of a cyclically softening alloy steel. The amount of diametral dilation is one order of magnitude smaller than achieved by traditional autofrettage methods for the same residual compressive stresses.

Thick-walled cylinders are commonly made of high strength alloy steels, which in general, show cyclic softening. The high strength material is used even at the expense of fracture toughness in an attempt to contain high and pulsating pressure.

In FIG. 7 the residual tangential stresses, when pressure is cycled between zero and 100 ksi, are plotted together with the same residuals introduced by higher pressures but cycled only once. Only three cycles of 100 ksi produce higher residual compressive stresses than one cycle of 160 ksi pressure.

At 160 ksi pressure, 95% of the wall is yielded, however, at three cycles of 100 ksi, only 17.5% of the wall has been plastically strained. It was also found that the pressure need not be cycled between zero and 100 ksi but instead cycling between 40 ksi and 100 ksi for three cycles produced the same result. This is very important because the time and cost and problems associated with high pressure may be greatly reduced in cycling between 40 ksi and 100 ksi compared to cycling between zero and 100 ksi.

An important advantage obtained by the invention lies in the fact that the actual deformation of the cylinder bore at cyclical autofrettage is a full magnitude less, in essence is only 10%, of the yield of the cylinder bore at a single-cycle autofrettage that produces the same residual tangential stress. This provides for improved accuracy of the cylinder bore, which is extremely important for gun barrels and pump cylinders.

In summation, the major advantages of the invention in comparison with the conventional single-cycle process are:

1. It requires relatively lower pressure to autofrettage thick-walled cylinders.
2. The cost to autofrettage thick-walled cylinders will be less because of lower pressure used.
3. Much higher residual tangential stresses will be introduced at the bore of thick-walled cylinders than the conventional method.
4. The higher residual tangential stress at the bore will dramatically increase the fatigue life of thick-walled cylinders.
5. The increase of the bore diameter of thick-walled cylinders will be less than one tenth of that due to the conventional autofrettage method. The dimensional control is very critical in some applications such as pump cylinders and gun barrels. The pressure levels following the first cycle of autofrettage need not be the same as the first one. The succeeding pressure after each autofrettage cycle may be higher than the immediately pre-ceding pressure and the resulting residual compressive stresses are proportionately greater. Any cyclic pressure, however, must not exceed the pressure that causes a reverse yielding at bore upon unloading or that causes a complete plastic deformation of the thick-walled cylinder to its outer radius.

What is claimed is:

1. A process of subjecting a generally thick-walled, hollow cylindrical member to autofrettage including sealing the inner bore of said cylindrical member, and pressurizing said inner bore; comprising the steps of:
   (a) imparting at least one predetermined pressure to the entire length of said inner bore for a period of time; and
   (b) cyclically repeating the application of at least the same pressure with each cycle so as to plastically deform the inner bore of said cylindrical member and produce residual tangential compressive stresses in said bore.

2. A process as claimed in claim 1, wherein said cyclical pressures extend up to where about 25% of the wall thickness commensing from the bore is penetrated by said plastic deformation.

3. A process as claimed in claim 1, wherein said cyclical pressures are in the range of between one half of the bore yield pressure and the pressure which causes 25% of the wall to plastically deform.

4. A process as claimed in claim 1, wherein said cyclical pressures are applied at least two times to said cylindrical member.

5. A process as claimed in claim 1, said cylindrical member being a closed-end cylinder, said cyclical pressures being applied for at least two cycles consisting of four pressure reversals.

6. A process as claimed in claim 1, said cylindrical member being an open-ended cylinder, said cyclical pressures being applied for at least two cycles consisting of four pressure reversals.

7. A process as claimed in claim 1, wherein said plastic deformation produces residual tangential compressive stresses extending from said inner bore radially outwardly for about 25% of the thickness of the cylindrical member.

8. A process as claimed in claim 1, or 2 or 5 or 6 wherein said cylindrical member being autofrettaged is formed of a high-strength alloy steel.

9. A process as claimed in claim 8, wherein said alloy steel is AISI 4333 M6 steel.

10. A process as claimed in claim 8, wherein said alloy steel is AISI 4340 steel.

11. A process as claimed in claim 1, or 2 or 5 or 6 wherein said inner bore is pressurized by a hydraulic fluid.

12. A process as claimed in claim 11, wherein said hydraulic fluid medium is ethylene glycol.

13. A process as claimed in claim 11, wherein said hydraulic fluid medium is hydraulic oil.

14. A process as claimed in claim 8, wherein said predetermined pressure extends up to about 150,000 psi.

15. A process as claimed in claim 1 or 2 or 3 or 5 or 6, wherein the predetermined pressure is increased with one or more successive applications of pressure.

16. A process of subjecting a hollow metal cylindrical member to autofrettage wherein the cylinder is sealed and pressure is applied to the inner bore of said cylinder, said process comprising:
   (a) establishing a bore yield pressure for each cylindrical configuration and metallic composition to be autofrettaged, said bore yield pressure being the pressure at which plastic deformation first occurs on the inner wall of the bore;
   (b) establishing a maximum yield pressure for each cylindrical configuration and metallic composition to be autofrettaged, said maximum yield pressure being the pressure at which the cylinder wall is plastically deformed to its outerwall;
   (c) selecting at least one autofrettage pressure from a range of pressures, said range beginning at said bore yield pressure and extending to twice said bore yield pressure, said selected autofrettage pressure(s) being less than said maximum yield pressure;
   (d) applying said autofrettage pressure(s) to said inner bore to cause plastic deformation of the inner wall of said bore;
   (e) cyclically repeating the application of said selected autofrettage pressure(s) to further increase the residual tangential compressive stress in said bore with each successive application of autofrettage pressure;
   (f) terminating the cyclic application of said autofrettage pressure(s) before an area of plastic penetration reaches the outer walls of said cylinder;
   whereby the residual tangential compressive stress generated by said cyclic application of pressures is greater than the residual compressive stress that may be generated by a single application of autofrettage pressure at any pressure level.

17. A process as claimed in claim 16, wherein the autofrettage pressure is increased with at least one of the successive applications of cyclic pressures.

18. A process as claimed in claim 16, wherein said process is performed on a closed end cylinder, and said cylindrical pressures are applied for at least two cycles.

19. A process as claimed in claim 16, wherein said process is performed on an open ended cylinder, and said cyclic pressures are applied for at least two cycles.

20. A process as claimed in claim 16 or 17 or 18, wherein said cylindrical member is first formed from a high-strength alloy steel.

21. A process as claimed in claim 17, wherein the high-strength alloy is selected from the group of AISI 4340, and 4333M6 steels.

22. A process as claimed in claim 17, wherein the preselected autofrettage pressure is 150 ksi.

23. A process as claimed in claim 17, wherein said pressurization is applied for a predetermined period of time, said time period selected from the range of one second to four minutes.

24. A process as claimed in claim 16 or 17 or 18 or 19, wherein said cyclic application of pressure is limited to cycles between said preselected autofrettage pressure and a preselected minimum pressure, said preselected minimum pressure being below the bore yield pressure but greater than 50 percent of the bore yield pressure.

25. A process as claimed in claims 16 or 17 or 18 or 19, wherein the cycles of pressurization are repeated until between 25 percent and 50 percent of the wall thickness is penetrated by said plastic deformation.

26. A process of subjecting a hollow cylindrical member to autofrettage which includes sealing the inner bore of the cylindrical member and pressurizing said inner bore, said process comprising:
   (a) establishing a bore yield pressure for the cylindrical material and configuration;
   (b) subjecting the inner walls of said bore to at least one predetermined autofrettage pressure in excess of said bore yield pressure to plastically deform the inner bore of said cylinder;
   (c) cyclically varying the application of pressure between said predetermined autofrettage pressure and a predetermined minimum pressure, said minimum pressure being lower than the bore yield pressure, but greater than 50 percent of the bore yield pressure;
   (d) selecting at least one predetermined pressure and number of cycles to increase the residual tangential compressive stress of the cylinder beyond that of a single cycle autofrettage;
   (e) terminating said cyclic variation before an area of plastic penetration reaches the outer wall of said cylinder.

27. A process as claimed in claim 26, wherein the autofrettage pressure is increased with at least one of the successive applications of cyclic pressure.

28. A process as claimed in claim 26, wherein the autofrettage pressure is increased with each successive application of cyclic pressures.

29. A process as claimed in claim 27, wherein said process is performed on a closed end cylinder, and said cyclic pressures are applied for at least two cycles.

30. A process as claimed in claim 27, wherein said process is performed on an open ended cylinder, and said cyclic pressures are applied for at least two cycles.

31. A process as claimed in claim 26, or 27 or 28 or 29, wherein said cylindrical member is first formed from a high-strength alloy steel.

32. A process as claimed in claim 27, wherein the high-strength alloy is selected from the group of AISI 4340, and 4333M6 steels.

33. A process as claimed in claim 26, wherein the preselected autofrettage pressure is 150 ksi.

* * * * *